Aug. 3, 1948.  E. D. L. BOWMAN  2,446,455

LAMP CONSTRUCTION

Filed March 9, 1945

INVENTOR.
ERVIN D. L. BOWMAN
BY
Bates, Teare, & McBean
ATTORNEYS

Patented Aug. 3, 1948

2,446,455

UNITED STATES PATENT OFFICE 2,446,455

LAMP CONSTRUCTION

Ervin D. L. Bowman, Fairview Village, Ohio

Application March 9, 1945, Serial No. 581,770

2 Claims. (Cl. 240—8.3)

This invention relates to an improved lamp, and particularly to a lamp adapted for use in connection with motor vehicles and the like. More specifically, the invention relates to an improved lamp construction which may be used as a tail light or warning light on motor vehicles and the like. These, therefore, are the general objects of the present invention.

An object of the invention is to provide an improved lamp which may be used in connection with motor vehicles, and which will be so constructed as to direct a warning ray visible to one approaching the vehicle, and at the same time illuminate a portion of the vehicle adjacent which the lamp is positioned.

A more specific object of the present invention is to provide an improved lamp construction which will emit red or warning rays visible to one approaching the vehicle from one direction; white rays visible to one approaching the vehicle from the opposite direction; and both red and white rays visible to one approaching from the side of the vehicle.

A further object of the invention is to provide a vehicle lamp which may be used either with single or dual contact lamp bulbs.

A further object of the invention is to provide an improved lamp construction which may be easily and economically manufactured and readily adaptable for use in present motor vehicles.

Other objects of the invention will become more apparent from the following description relating to a preferred embodiment of the invention illustrated in the accompanying drawings. The essential characteristics of the invention will be summarized in the claims.

Figure 1:
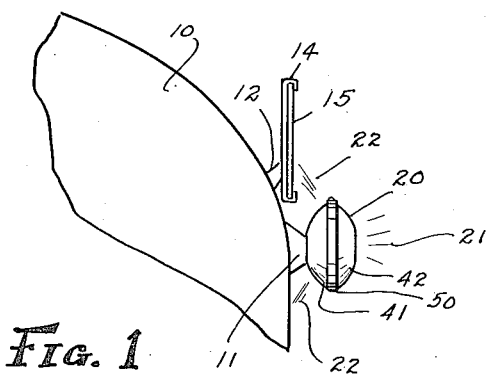
Figure 2:
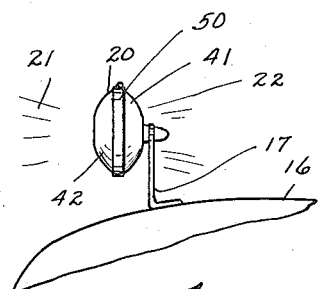
Figure 3:
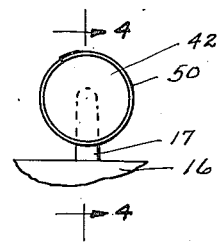
Figure 4:
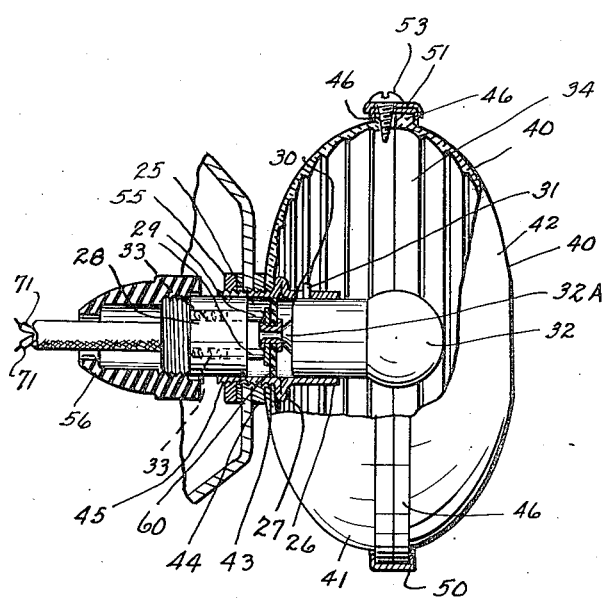
Figure 5:
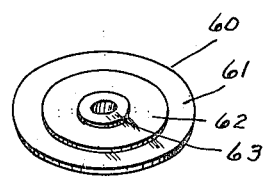

In the drawings, Fig. 1 is a fragmentary side elevation of a motor vehicle illustrating my improved lamp in position; Fig. 2 illustrates a different type of mounting for my improved lamp; Fig. 3 is an elevation looking at the left hand side of Fig. 2; Fig. 4 is a substantially centrally located section through the improved lamp and mounting, the plane of the section being indicated by the lines 4—4 on Fig. 3; and Fig. 5 is a perspective view of one element of the lamp construction.

Referring now to the drawings, Fig. 1 illustrates a view of the rear portion 10 of a motor vehicle, provided with a mounting bracket formation 11 to which is secured my improved lamp 20 as will hereinafter be more fully described. The vehicle is also provided with bracket 12 which is positioned adjacent the lamp bracket, and which supports a carrier 14 in which a license plate 15 may be mounted in the usual manner. The lamp 20 is so arranged that a red signal or warning rays 21 are visible to anyone approaching from the rear of the vehicle, and at the same time provides illuminated rays designated 22 for illuminating the license plate or other portions of the vehicle adjacent the lamp.

In Fig. 2, I have illustrated a modified form of mounting for the lamp. In this form the lamp 20 is mounted as for instance on the top 16 of the vehicle, by means of an L-shaped bracket 17. In this instance the warning rays 21 are as before visible to one approaching the vehicle from one direction, while the white rays 22 are visible to one approaching the vehicle from the opposite direction.

My improved lamp construction is best illustrated in Fig. 4 and as there shown comprises a lamp socket generally indicated at 25. The socket 25 comprises a metallic tube 26 which is provided, intermediate its ends with an annular bead 27. Secured in the rear portion of the tube 26, is an electrical plug 28 of insulating material which carries the usual spring-pressed contacts 29. The portion of the tube 26 forward of the bead 27 is provided with the usual bayonet slot indicated at 30, and arranged in the usual manner to receive the pin 31 of a lamp 32. The springs, generally indicated at 33, as being mounted in the plug 28 in the usual manner, serve to maintain the lamp in position.

The lamp 32 is housed in a translucent housing 40. The housing 40 comprises, as shown, two complementary shells 41 and 42 substantially identical in formation, both being dished or concave to provide a lamp enclosure space 34. The shell 41 is transparent and colorless, while the shell 42 is translucent and colored red. Both shells are preferably made of a material such as a plastic. The shell 41 is provided with a central opening 43 in which is inserted the socket member 25. The bead 27 of the socket engages the inner surface of the shell, so that the shell may be held rigidly in place thereagainst a nut 44 carried by the rear or threaded portion 45 of the tube 26. The shells 41 and 42 are both concave and are provided with coacting annular beads 46. The shell 42 is retained in position on the shell 41 by a metal annulus or band 50. This band is channel-shaped in cross section, and is so arranged that the ends may be overlapped, as indicated at 51, and secured together as well as to the one of the shells by a suitable screw 53.

The lamp assembly is so arranged that the socket 25 passes through an opening in the bracket formation 11 or 17 as indicated in Fig. 4, and is secured in position thereon by a lock nut 55. The socket member is protected by the usual composition protecting member 56.

Ordinarily double contact bulbs are used with lamps of this type. In such instances the bulb contacts engage respective contacts 29 of the socket. However, I have shown the lamp as being used with a single contact bulb. For this purpose, I have provided the socket with an insert or adaptor 60. This adaptor comprises a disc of insulating material 61 having a metallic disc 62 of slightly smaller diameter positioned against one side thereof. The two discs are held together by the hollow rivet 63 passing through the suitable openings in the center of the discs. The arrangement is such that when a single contact lamp is used, as shown in Fig. 4, the contact 32a of the lamp engages metallic rivet 62 on one side of the adaptor while the metallic washer 62 engages both contacts 29 of the plug 28. When a dual contact lamp is used the adaptor is removed from the socket and both contacts 29 used in the usual manner. It is obvious that the electrical conductors 71 may be connected to a source of supply in a manner suitable for the type of lamp used.

In the preferred form of construction the shell 42 is made of a translucent material and is colored red so as to cast a red ray and thus provide a warning signal to one approaching the lamp from that face, whereas the shell 41 is a clear uncolored translucent material so that it will cast a clear white beam either to one approaching that side of the lamp or upon the vehicle itself, as illustrated in Fig. 1, to illuminate the license plate or other matter.

From the foregoing description it will be seen that I have provided a highly efficient lamp which may be used both as a warning signal and to illuminate a license plate or other portion of the vehicle, which lamp may be readily and economically manufactured and will be adaptable for use with either single or double contact lamp bulbs.

I claim:

1. In a lamp, a lamp socket, a lamp mounted in the socket, a pair of complementary concave plastic lamp enclosure shells, one of said shells being clear and transparent and the other being colored and translucent, the clear shell having a central opening arranged to receive said lamp socket, means to secure said shell to said socket, both of said shells having integrally formed beads at their periphery, an annular metallic band channel-shaped in cross section embracing said beads to retain them in engagement with each other, said band having its ends in an overlapping relation, and a screw extending through the overlapping portions and into one of said bead formations.

2. In a lamp construction, a tubular metallic socket member, an electrical plug secured to one end of said member, means at the other end of said member to receive a lamp, said tubular member having an annular bead, a hollow clear transparent plastic shell having a central opening through which said tubular member passes, a nut carried by said socket member to secure said shell in position on the tubular member against said bead, a colored translucent plastic shell complementary to the first-named shell, both of said shells having integrally formed annular beads adjacent their coacting portions and means engaging said beads comprising an annular overlapping metallic band, said band being channel-shaped in cross section, and a metal screw passing through the overlapping portions of said band and into one of said shell means to secure the shell together.

ERVIN D. L. BOWMAN.

REFERENCES CITED

The following references are of record in the file of this patent:

UNITED STATES PATENTS

| Number | Name | Date |
|---|---|---|
| 1,184,952 | Hipkins | May 30, 1916 |
| 1,418,036 | Tonkin | May 30, 1922 |
| 1,543,079 | Godley | June 23, 1925 |
| 1,609,277 | Oliver | Nov. 30, 1926 |
| 1,828,233 | Smith | Oct. 20, 1931 |
| 1,995,661 | Wardwell | Mar. 26, 1935 |
| 2,001,472 | Sauer | May 14, 1935 |
| 2,119,452 | Woodhead | May 31, 1938 |
| 2,195,189 | Sauer | Mar. 26, 1940 |